Dec. 19, 1967 E. W. PALMER ETAL 3,358,869

VACUUM SEALING PLUG

Filed Aug. 19, 1965

INVENTORS
EARL W. PALMER
RONALD B. L. JONES
BY
Pennie, Edmonds, Morton, Taylor and Adams
ATTORNEYS United States Patent Office
3,358,869
Patented Dec. 19, 1967

3,358,869
VACUUM SEALING PLUG

Earl W. Palmer and Ronald B. L. Jones, Watertown, Conn., assignors to Anaconda American Brass Company, a corporation of Connecticut
Filed Aug. 19, 1965, Ser. No. 480,924
1 Claim. (Cl. 220—24.5)

ABSTRACT OF THE DISCLOSURE

A resilient plug is provided for vacuum sealing one end of an evacuated tubular member. The generally cylindrical tubular plug member is configured with first and second annular ring portions of greater diameter than the diameter of the tubular member so that it will slidably and sealingly engage the inner wall of the tubular member and has a diaphragm extending across the bore of the cylindrical body member to close the bore at the closed end portion which is inserted into the tube. A positive high pressure chamber defined by the axial bore and the differential in vacuum pressure within the tubular member and that of the atmosphere in the positive pressure chamber will cause the diaphragm to be displaced axially and increase the surface area of contact and radial pressure at the closed end of the tubular member to effect a tight sealing engagement with the inner wall of the tubular member.

Figure 1:
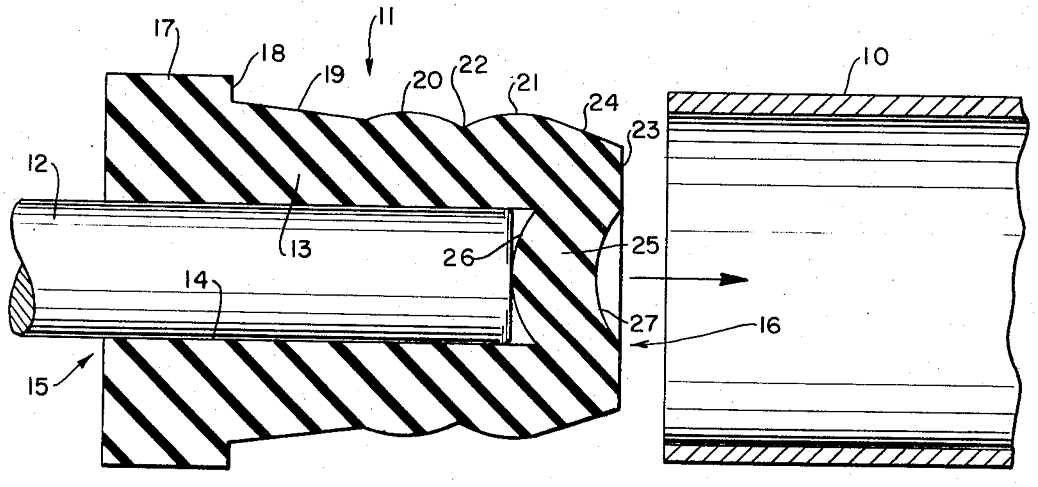

This invention relates to a vacuum sealing plug, and more particularly, it relates to a plug for insertion into one end of an evacuated tubular member where it is maintained in tight sealing engagement by the differential between the vacuum pressure within the member and that of the atmosphere.

In the tubing industry, the present practice is to clean and dry the interior of tubing that is to be sold as refrigeration or air conditioning tubing and then seal the open ends by caps to insure that the interior of the tubing remains clean and dry. If tubing used in refrigeration or air conditioning is not free from contaminants such as moisture, grease and dirt the operation of the refrigeration system will be impaired. For instance, dirt will obstruct the restricted valve apertures, moisture will turn to ice and clog the passageways, and some refrigerants are corrosive in the presence of moisture.

The caps commonly used in the industry are only frictionally secured to the end of the tubing and it is common for them to be blown off by an increase in pressure within the tube due to a change in atmospheric pressure or temperature during transit or storage, or to be knocked off during transit. More recently the practice has been to clean the interior of the tube thoroughly and then evacuate it to a subatmospheric pressure; the ends of the tube are then sealed by sealing caps and the pressure differential between the inside of the tube and the atmosphere causes the sealing caps to be held on the ends of the tube. These caps, although an improvement in that they were sealed both by friction and by the differential in pressure on opposite sides of the cap, were nevertheless subject to physical damage and any dislocation of the cap destroyed the vacuum seal and the advantages of this type of seal were lost.

It is a purpose of the invention to provide a plug for sealing one end of a tubular member which not only is inserted into the end of the tube and therefore not apt to be physically dislocated but also by its configuration positively utilizes the differential in pressure to increase the frictional contact of the plug within the tube.

Broadly stated, the invention is in a resilient plug for vacuum sealing one end of an evacuated tubular member.

It is comprised of a generally cylindrical body member having an axial bore extending from one open end to a closed end and has an annular flange portion extending radially outward from the open end to define a shoulder by the increase in diameter from the cylindrical member. A diaphragm portion extends across said bore at said closed end and closes said bore. The diaphragm has a normally concavo-convex shape with the convex side defining the closed end of said bore and the concave side inwardly recessed from the endmost portion of the closed end of the plug. At least one annular convex-shaped integral annular ring portion extends radially outward from the body member along said closed end portion. The ring portion has a greater diameter than the inside diameter of the tubular member so that it will slidably and sealingly engage the inner wall of the tubular member and the diaphragm is sufficiently flexible such that the differential in vacuum pressure within the tubular member and that of the atmosphere will cause the diaphragm to be displaced axially out of its concavo-convex shape to a substantially flattened shape to cause an increase in radial pressure along a portion of the body member where the annular ring portion is positioned to flatten a portion of the convex-shaped ring portion in tight sealing engagement with the inner wall of the tubular member.

By this construction, the plug can be slidably and sealingly inserted into the end of an evacuated tube. As soon as a seal is effected between the ring portion of the plug and the tube, and atmospheric pressure allowed to act on the plug, the diaphragm will be axially displaced toward the interior of the tube and become substantially flattened out of its concavo-convex shape. The displacement of the diaphragm will cause a substantial increase in the density of the resilient material radially along a plane defined by the flattened diaphragm and in part by a portion of the annular ring and thereby flatten the ring portion in tight frictional engagement with the inner wall of the tubular member. The plug is thereby easily insertable into the tubular member and the differential in pressure is used both to hold the plug against axial displacement and to increase the frictional hold on the inner wall of the tube.

Figure 2:
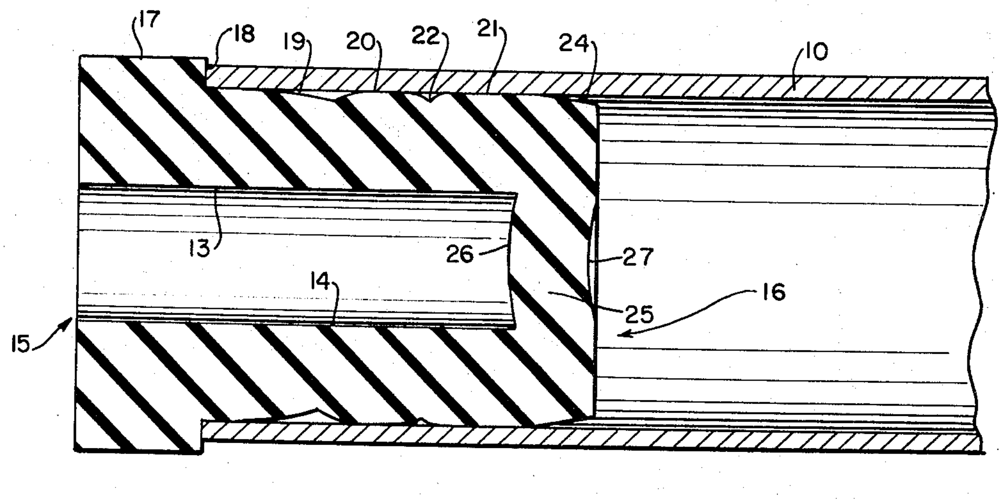

A preferred embodiment is described below with reference to the drawings wherein:

FIG. 1 is a side elevation in section of a plug being inserted into an end of a tube; and FIG. 2 is a side elevation in section of the plug inserted into the end portion of the tube.

The method of sealing a tube 10 is to seal one end of the tube and then isolate the opposite end from the atmosphere by positioning the end in a specially designed vacuum chamber. The interior of the tube is then evacuated to subatmospheric pressure and a sealing plug 11 of the invention is brought forward on a rod 12 and axially inserted into the open end of the tube.

The plug 11 is preferably constructed of rubber. Other materials can be used provided they are able to withstand prolonged storage under a diversity of temperature and humidity conditions without losing their resiliency or cracking or splitting. The plug is constructed of a generally cylindrical body member 13 which has an axial bore 14 extending from one open end 15 to a closed end 16. An annular flange portion 17 extends radially outward at the open end 15 to a greater diameter than the inside diameter of the tube and defines a shoulder 18 by the increase in diameter between the flange portion and the body member 13, which shoulder will abut the endmost edge of the tube when inserted. An intermediate tapered portion 19 of the body member is provided by a taper in diameter from adjacent the flange portion 17 to a first annular ring portion 20. The diameter of the intermediate portion tapers from a diameter slightly greater than the inside diameter of the tube to be sealed to the first annular ring portion 20.

The first annular ring portion 20 extends radially outward from the body member and has a convex-shaped periphery which has a maximum diameter dimension greater than the inside diameter of the tube to be sealed. A second annular ring portion 21 is provided adjacent the closed end 16 of the body member and extends radially outward therefrom and is axially spaced from the first ring portion by a substantially reduced annular valley 22. The diameter of the second ring portion is preferably dimensioned the same as the first ring portion and it also has a convex-shaped periphery. The second ring portion 21 is axially connected to the endmost edge 23 of the closed end 16 by an inwardly bevelled marginal end portion 24.

Positioned within the body member 13 is a diaphragm 25 which extends across the bore 14 and closes it at the closed end 16. The diaphragm 25 has a normally concavo-convex shape with its convex side 26 defining the closed end of the bore and the concave side 27 being inwardly recessed from the endmost edge 23 of the body member. It is preferably of a thickness slightly less than the thickness of the walls of the body member.

Upon inserting the plug into the end of the tube, as shown in FIG. 2, the first and second annular ring portions 20 and 21 will slidably and sealingly engage the inner wall of the tubular member. The initial seal effected between the ring portions and the inner wall is sufficient to effect at least a partial vacuum seal therebetween. This seal thus effected, the thickness and resiliency of the diaphragm is such that it will be axially displaced toward the interior of the tube by the differential in pressure on opposite sides thereof and substantially flattened out of its normally concavo-convex shape as shown. At least a portion of the diaphragm underlies a portion of the second ring portion 21 and displacement of the diaphragm causes a substantial increase in the density of the material being radially compressed along a plane extending perpendicular to the axis of the body member and the tube, which plane is defined in part by the flattened diaphragm and in part by a portion of the second annular ring 21. It is not necessary that the diaphragm completely flatten or that a true plane be defined by the diaphragm, rather a substantial flattening such as shown in FIG. 2 is desirable so that additional material is provided to radially compress a portion of the second annular ring portion 21 and a portion of the bevelled marginal end portion 23 against the inner wall of the tube and effect an increase in surface area of contact and pressure for greater frictional contact along these portions and thereby simultaneously increase the mechanical resistance of the plug to displacement axially out of the tube while maintaining a pressure differential on opposite sides of the plug to hold it axially within the tube.

The diaphragm 25 is shown with a substantial portion where it is integrally connected with the body member axially forward of the ring portion 21 and closer to the endmost edge. In the construction shown the diaphragm is only slightly smaller in thickness than the wall thickness of the body member and this partial axial spacing of the diaphragm forward of the ring portion insures initial ease of displacement of the diaphragm axially under the differential in pressure because a substantial portion of the diaphragm underlies the bevelled marginal end portion 24.

The plug has particular utility when used with elongated tubing and both ends of the tube are sealed with identical plugs.

We claim:

A resilient plug for vacuum sealing one end of an evacuated tubular member comprising a generally cylindrical body member having an axial bore extending from one open end to a closed end and thereby defining a positive high pressure chamber, an annular flange portion extending radially outward from the open end to a greater diameter than the inside diameter of the tube and defining a shoulder by the increase in diameter from the cylindrical member, a diaphragm portion extending across said bore at said closed end and closing said bore, said diaphragm having a normally concavo-convex shape with the convex side defining the closed end of said bore and the concave side inwardly recessed from the endmost portion of the closed end of the plug said diaphragm being of a thickness slightly less than the thickness of the wall of the body chamber, a first annular convex-shaped integral ring portion extending radially outward from the body member along an intermediate portion, an intermediate tapered portion of the body member tapering in diameter from adjacent the flange portion to said first ring portion, a second annular convex-shaped integral ring portion extending radially outward from the body member along said closed end portion, said second ring portion being axially connected to the endmost edge of the closed end by an inwardly bevelled marginal end portion, said first and second ring portions having a greater diameter than the inside diameter of said tubular member so that they will slidably and sealingly engage the inner wall of the tubular member, at least a portion of said diaphragm underlies a portion of the second ring portion with a substantial portion integrally connected with the body member axially forward of the ring portion at the endmost edge and said diaphragm is sufficiently flexible such that the differential in vacuum pressure within the tubular member and that of the atmosphere in the positive pressure chamber will cause the diaphragm to be displaced axially out of its concavo-convex shape to a substantially flattened shape causing an increase in surface area of contact and radial pressure along a portion of the body member where said annular ring portion is positioned to flatten a portion of the convex-shaped ring portion and a portion of the bevelled marginal end portion in tight sealing engagement with the inner wall of the tubular member.

References Cited

UNITED STATES PATENTS

| | | | |
|---|---|---|---|
| 2,954,890 | 10/1960 | Del Valle | 215—52 |
| 3,274,747 | 9/1966 | Fueslein et al. | 53—22 |
| 2,454,555 | 11/1948 | Henderson | 138—89 |
| 2,737,205 | 3/1956 | Stringfield | 138—89 |
| 3,200,984 | 8/1965 | Fueslein | 138—89 X |
| 3,213,672 | 10/1965 | Orr | 138—89.4 X |

FOREIGN PATENTS

| | | |
|---|---|---|
| 550,250 | 12/1942 | Great Britain. |

SAMUEL ROTHBERG, *Primary Examiner.*

N. C. CUDDEBACK, *Assistant Examiner.*